United States Patent
Auvray et al.

(10) Patent No.: US 7,403,608 B2
(45) Date of Patent: Jul. 22, 2008

(54) ECHO PROCESSING DEVICES FOR SINGLE-CHANNEL OR MULTICHANNEL COMMUNICATION SYSTEMS

(75) Inventors: Monique Auvray, Lannion (FR); Grégoire Le Tourneur, St Quay-Perros (FR); Jean-Philippe Thomas, Trevou Treguignec (FR)

(73) Assignee: France Telecom, Paris (FR)

( * ) Notice: Subject to any disclaimer, the term of this patent is extended or adjusted under 35 U.S.C. 154(b) by 245 days.

(21) Appl. No.: 10/519,744

(22) PCT Filed: Jun. 18, 2003

(86) PCT No.: PCT/FR03/01874

§ 371 (c)(1),
(2), (4) Date: Dec. 28, 2004

(87) PCT Pub. No.: WO2004/004298

PCT Pub. Date: Jan. 8, 2004

(65) Prior Publication Data

US 2006/0034355 A1 Feb. 16, 2006

(30) Foreign Application Priority Data

Jun. 28, 2002 (FR) .............................. 02 08056

(51) Int. Cl.
H03M 9/08 (2006.01)

(52) U.S. Cl. ............................ 379/406; 379/406.02

(58) Field of Classification Search ............ None
See application file for complete search history.

(56) References Cited

U.S. PATENT DOCUMENTS

| | | | | |
|---|---|---|---|---|
| 5,371,789 | A * | 12/1994 | Hirano | 379/406.08 |
| 5,646,990 | A * | 7/1997 | Li | 379/406.08 |
| 5,734,715 | A * | 3/1998 | Scalart et al. | 379/406.08 |
| 5,970,137 | A * | 10/1999 | Le Damany et al. | 379/388.01 |
| 6,246,760 | B1 | 6/2001 | Makino et al. | |

FOREIGN PATENT DOCUMENTS

FR 2 738 695 3/1997
FR 2 748 184 10/1997

* cited by examiner

Primary Examiner—Ramnandan Singh
(74) Attorney, Agent, or Firm—Cohen Pontani Lieberman & Pavane LLP

(57) ABSTRACT

An echo processing technique for attenuating echo components of a direct signal $X1n$ in a return signal $Y2n$. A receive gain $Gr_n$ and a send gain $Ge_n$ are calculated. The receive gain $Gr_n$ is applied to the direct signal and an input signal $X2n$ is produced and emitted into an echo generator system. The send gain $Ge_n$ is applied to an output signal $Y1n$ from the echo generator system and the return signal $Y2n$ is produced. A coupling variable COR is calculated which is characteristic of the acoustic coupling between the direct signal $X1n$ or the input signal $X2n$ and the output signal $Y1n$. The receive gain $Gr_n$ and the send gain $Ge_n$ are calculated on the basis of the coupling variable.

35 Claims, 7 Drawing Sheets

ECHO PROCESSING DEVICES FOR SINGLE-CHANNEL OR MULTICHANNEL COMMUNICATION SYSTEMS

RELATED APPLICATIONS

This is a U.S. National Phase Application under 35 USC 371 of International Application PCT/FR2003/001874, filed on 18 Jun. 2003.

FIELD OF THE INVENTION

The field of the present invention is that of communications. The invention relates more particularly to variable-gain and/or adaptive filtering acoustic echo processing devices for attenuating echo components of a direct signal in a return signal. The invention applies to single-channel and multi-channel communications systems.

BACKGROUND OF THE INVENTION

Acoustic echoes occur primarily in certain types of communication in which a remote user terminal comprises one or more directional microphones and one or more loudspeakers instead of an earpiece. Examples include audioconference equipment and hands-free telephones, such as mobile telephones. The source of the echoes is simple: failing special precautions, sound emitted by the loudspeaker(s) is reflected many times (from walls, the ceiling, etc.), constituting as many different echoes which are picked up by the microphone(s) on the same terms as wanted speech. Thus the combination of the loudspeaker(s), the microphone(s), and their physical environment constitutes an echo generator system.

The acoustic echo problem has been the subject of much research, both in the case of single-channel systems (one microphone and one loudspeaker) and in the case of multi-channel systems (a plurality of microphones and a plurality of loudspeakers). The echo problem in the multichannel situation is similar to that in the single-channel situation except that all possible acoustic couplings between the various microphones and loudspeakers must be considered.

The echo processing techniques most widely used include echo suppression techniques using gain variation and echo cancellation techniques using adaptive filtering.

In a variable-gain echo suppression system, a receive gain is applied to the signal for application to the loudspeaker (the direct signal at the input of the echo generator system) and a send gain is applied to the signal coming from the microphone (at the output of the echo generator system), forming the return signal. An echo suppression system of this type is described in French Patent No. 2 748 184.

Receive voice activity detectors (RVAD), send voice activity detectors (SVAD), and double speech detectors (DSD) typically supply the necessary information to the modules that calculate the send and receive gains. Thus when the remote party is speaking (detected by the RVAD), the send gain is reduced to attenuate the echo. If the local party begins to speak (detected by the SVAD), this constraint on the send gain is removed and the receive gain is reduced. In the event of double speech (both parties speaking simultaneously, detected by the DSD), either a comparator determines which speaker is louder and gives priority to that speaker's sending direction or an intermediate setting of the send and receive gains is established.

In an acoustic echo canceller (AEC) using adaptive filtering, an identification filter estimates the acoustic coupling between the loudspeaker and the microphone and generates a signal that is used to cancel the echo. The identification filter is conventionally a programmable finite impulse response filter whose coefficients need to be adapted by a predetermined algorithm for updating coefficients using an adaptation step. The coefficients are adapted on the basis of the signal to be applied to the loudspeaker. An echo canceller of this type is described in French Patent No. 2 738 695.

A variable gain echo suppression system is often combined with an echo canceller to eliminate the residual echo that remains after echo cancellation.

However, the above-mentioned echo processing systems have the drawback that they are not able to take account of variations in the acoustic coupling between the loudspeaker and the microphone if those variations are independent of the signal applied to the loudspeaker.

This is the case, for example, if there is an external facility for adjusting the sound level reproduced by the loudspeaker (for example by means of a potentiometer). Any variation in the reproduced sound level modifies the acoustic coupling between the loudspeaker and the microphone and therefore the echo(es) picked up by the microphone. The echo processing system takes account only of the signal that is applied to the loudspeaker, and not of the sound that is actually reproduced by the loudspeaker, and is therefore unable to take this kind of modification of the acoustic coupling into account in its calculation process.

For example, if the sound reproduction level is reduced after the system has been initialized with a maximum sound level setting, in a double speech situation the remote speech emitted by the loudspeaker may be broken up or truncated.

Similarly, if the microphone and the loudspeaker in the communications terminal being used are physically independent of each other, the distance between them may be varied, which varies the acoustic coupling between the loudspeaker and the microphone, with the same consequences.

The problem is the same in a multichannel situation except that it generalized to the multiple couplings between the various microphones and loudspeakers.

SUMMARY OF THE INVENTION

One particular object of the present invention is to remedy the drawbacks of prior art echo processing systems described hereinabove.

To this end, in a first aspect, the present invention provides an echo processing device for attenuating echo components of a direct signal $X1n$ in a return signal $Y2n$, said device comprising:
  means for calculating a receive gain $Gr_n$ and a send gain $Ge_n$;
  first gain application means for applying the receive gain $Gr_n$ to the direct signal and producing an input signal $X2n$ emitted into an echo generator system; and
  second gain application means for applying the send gain $Ge_n$ to an output signal $Y1n$ from the echo generator system and producing the return signal $Y2n$.

According to an embodiment of the invention, this echo processing device is noteworthy in that it further comprises means for calculating a coupling variable COR characteristic of the acoustic coupling between the direct signal $X1n$ or the input signal $X2n$ and the output signal $Y1n$ and in that said gain calculation means are adapted to calculate the receive gain $Gr_n$ and the send gain $Ge_n$ on the basis of said coupling variable.

Taking account in the device of the real acoustic coupling between the loudspeaker and the microphone when controlling the variation of the receive and/or send gain applied automatically adapts the sound quality of the sent signal and the received signal as a function of changes in the acoustic environment of the echo processing device and the relative position of the transducers (loudspeaker(s), microphone(s)) and as a function of the sound reproduction level chosen by the user, for example.

According to one particular feature of the invention, the echo processing device comprises means for estimating the instantaneous power of the direct signal $X1n$ or the input signal $X2n$ and the instantaneous power of the output signal $Y1n$. The gain calculation means are adapted to calculate the receive gain $Gr_n$ and the send gain $Ge_n$ on the basis of a variable G determined as a function of the estimated power of the direct signal or the input signal and the estimated power of the output signal and as a function of the coupling variable COR, in accordance with the following equation:

$$G = \frac{P2n}{P2n + COR \cdot P1n}$$

where $P1n$ and $P2n$ are respectively an estimate of the power of the direct signal $X1n$ or the input signal $X2n$ and an estimate of the power of the output signal $Y1n$ at the time concerned.

The term "$COR \cdot P1n$" in the expression for the variable G represents the energy of the sound actually picked up by the microphone, and therefore taking into account all external adjustments that are not "seen" by the system (for example the sound reproduction level). The variable G therefore varies automatically as a function of real changes in loudspeaker/microphone acoustic coupling and the send and receive gains are therefore adapted automatically.

In a second aspect, the invention provides an echo canceller for attenuating, in an output signal $Y1_n$, echo components of an input signal $X2n$ emitted into an echo generator system, said device comprising:

a finite impulse response identification filter whose response is representative of the response of the echo generator system, receiving the input signal $X2n$ at its input and generating a filtering signal Sn;
  subtraction means receiving at an input a signal $Y3n$ from the echo generator system, at least one component of which is a response of the echo generator system to the input signal $X2n$, and the filtering signal Sn, and adapted to subtract the filtering signal Sn from the signal $Y3n$ and to produce the output signal $Y1n$;
  means for adapting the coefficients of the identification filter as a function of an adaptation step $\mu_n$; and
  means for calculating the adaptation step $\mu_n$.

This echo canceller is noteworthy in that the adaptation step calculation means comprise means for estimating the power $P1n$ of the input signal $X2n$ and the power $P3n$ of the signal $Y3n$ and means for calculating a first coupling variable COR2 characteristic of the acoustic coupling between the input signal $X2n$ and the signal $Y3n$ from the echo generator system, the adaptation step $\mu_n$ of the identification filter being calculated as a function of the estimated powers $P1n$, $P3n$ and as a function of the first coupling variable COR2.

Evaluating the above coupling variable COR2 means that the adaptation step of the filter may be "driven" as a function of the real acoustic coupling between the input signal and the output signal of the echo generator system. This improves the responsiveness of the echo canceller as a function of changes in the acoustic environment of the device, and therefore improves the result of echo processing.

In a preferred embodiment, the adaptation step $\mu_n$ is obtained from the equation:

$$\mu_n = \frac{P1n}{\alpha \cdot P1n + COR2 \cdot P3n}$$

in which $\alpha$ is a positive constant and $P1n$ and $P3n$ are respectively an estimate of the power of the input signal $X2n$ and an estimate of the power of the signal $Y3n$ from the echo generator system, at the time concerned.

In one embodiment, the adaptation step calculation means further comprise means for calculating a second coupling variable COR characteristic of the acoustic coupling between the input signal $X2n$ from the echo generator system and the output signal $Y1n$, the second coupling variable COR being obtained by calculating the correlation between the input signal $X2n$ and the output signal $Y1n$, and the adaptation step $\mu_n$ of the identification filter being calculated as a function of the second coupling variable COR.

By additionally taking account of the second coupling variable COR, it is possible to determine the state of convergence of the identification filter and thus to apply finer control of the adaptation step.

In a third aspect, the invention provides an echo processing device for a multichannel communications system comprising N receive channels, N being an integer greater than or equal to 2, and M send channels, M being an integer greater than or equal to 1, each of the N receive channels i comprising an output transducer that produces a sound pressure wave in response to an input signal $X2n(i)$ derived from a direct signal $X1n(i)$, each of the M send channels j comprising an input transducer that converts a sound pressure wave into an output signal $Y1n(j)$, and said echo processing device being adapted to attenuate, in each output signal $Y1n(j)$, echo components stemming from some or all of the N input signals $X2n(i)$ and resulting from the acoustic coupling between the input transducer of the send channel concerned and some or all of the M output transducers.

According to an embodiment of the invention the device is noteworthy in that it comprises:

means for calculating receive gains $Gr_n(i)$ and send gains $Ge_n(j)$;
  means for applying a receive gain $Gr_n(i)$ to each direct signal $X1n(i)$ and producing the corresponding input signal $X2n(i)$:
  means for applying a send gain $Ge_n(j)$ to each output signal $Y1n(j)$ and producing the corresponding return signal $Y2n(j)$; and
  means for calculating, for each send channel j, N coupling variables COR(j,i), for i varying from 1 to N, each of which is characteristic of the acoustic coupling between the output signal $Y1n(j)$ of the send channel and one of the N input signals $X2n(i)$;
  said gain calculation means being adapted to calculate each receive gain $Grn(i)$ and each send gain $Ge_n(j)$ on the basis of the N coupling variables COR(j,i) calculated for the associated send channel j.

The advantages of this mode of calculating gains in respect of a given pair of send and receive channels (i, j) are of the same kind as are obtained with a variable gain single-channel device of the invention, as briefly set out hereinabove.

In a preferred embodiment of the invention, the echo processing device comprises means for estimating the instantaneous power $P1n_i$ of each input signal $X2n(i)$ and the instantaneous power $P2n_j$ of each output signal $Y1n(j)$, said send gain calculation means being adapted to calculate each send gain Ge$n$(j) on the basis of N variables G(j,i), for i varying from 1 to N, each of which is determined as a function of the estimated power of an input signal X2$n$($i$) and the estimated power of the output signal Y1$n$($j$) of the send channel concerned and as a function of the corresponding coupling variable COR(j,i), and each of the variables G(j,i) being obtained from the following equation:

$$G(j, i) = \frac{P2n_j}{P2n_j + COR(j, i) \cdot P1n_i}$$

in which P1$n_i$ and P2$nj$ are respectively an estimate of the power of the input signal X2$n$($i$) concerned and of the power of the output signal Y1$n$($j$) concerned at the time concerned.

In a fourth aspect, the invention provides an echo canceller for a multichannel communications system comprising N receive channels, N being an integer greater than or equal to 2, and M send channels, M being an integer greater than or equal to 1, each of the N receive channels i comprising an output transducer that produces a sound pressure wave in response to an input signal X2$n$($i$), and each of the M send channels j comprising an input transducer that converts a sound pressure wave into an output signal Y1$n$($j$), the device comprising:

for each send channel j, N identification filters Fij with variable coefficients for estimating the acoustic coupling between each of the N output transducers and the input transducer of the send channel j, and for each filter Fij, means for adapting the coefficients of the filter as a function of an adaptation step $\mu_n$(i,j) and means for calculating the adaptation step $\mu_n$(i,j).

According to an embodiment of the invention, this device is noteworthy in that it comprises:

means for estimating the instantaneous power P1$n_i$ of each input signal X2$n$($i$) and the instantaneous power P2$n_j$ of each output signal Y1$n$($j$), and means for calculating, for each send channel j, N coupling variables COR(j,i), for i varying from 1 to N, each of which being characteristic of the acoustic coupling between the output signal Y1$n$($j$) of the same channel and one of the N input signals X2$n$($i$), the means for calculating the adaptation step $\mu_n$(i,j) for a filter Fij associated with a receive channel i and a send channel j, being adapted to calculate the adaptation step $\mu_n$(i,j) as a function of the powers P1$n_i$, for i varying from 1 to N, estimated for the N receive channels, as a function of the power P2$n_j$ estimated for the send channel j, and as a function of the N coupling variables COR(j,i), for i varying from 1 to N, associated with the send channel j.

In a preferred embodiment, an adaptation step $\mu_n$(i,j) for a filter Fij associated with a receive channel i and a send channel j is obtained from the following equation, in which $b_i$ is a positive constant:

$$\mu_n(i, j) = \frac{P1n_i}{b_i \cdot P1n_i + COR(j, i) \cdot P2n_j + \sum_{k \neq i} COR(j, k) \cdot P1n_k}$$

Further features and advantages of the invention will become apparent in the course of the following description of preferred embodiments of the invention, which is given with reference to the appended drawings, in which:

DETAILED DESCRIPTION OF THE DRAWINGS

Figure 1:
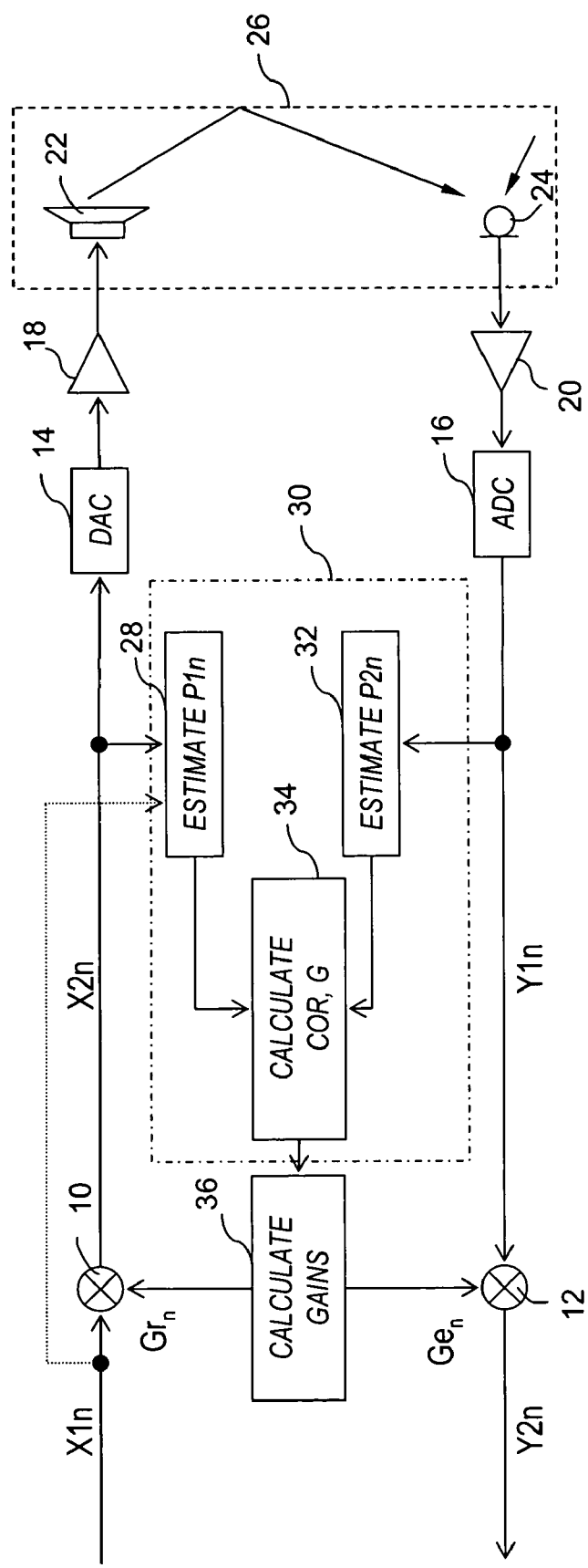
FIG. 1 is a block diagram of a variable gain single-channel echo processing device according to a first embodiment of the invention.

FIG. 1 shows a variable-gain single-channel echo processing device according to a first embodiment of the invention. This device is integrated into a hands-free telephone, for example.

As shown in FIG. 1, the device receives and sends digital signals X1$n$, Y2$n$ respectively called the direct signal and the return signal.

The echo processing device comprises a module 36 for calculating the receive gain (Gr$_n$) and the send gain (Ge$_n$). The receive gain Gr$_n$ is applied to the direct signal X1$n$ by a multiplier 10 to obtain an input signal X2$n$ that is emitted into an echo generator system 26.

Similarly, the send gain Ge$_n$ is applied to an output signal Y1$n$ from the echo generator system by a multiplier 12 to produce the return signal Y2$n$.

The input signal X2$n$ is delivered to a loudspeaker 22 via a digital-to-analog converter (DAC) 14 and an amplifier 18. The amplifier 18 is typically a variable-gain amplifier so that a user of the device may adjust the volume of the sound reproduced by the loudspeaker 22 to suit his convenience.

In a similar manner, the output signal Y1$n$ is obtained from a microphone 24 via an amplifier 20 and an analog-to-digital converter (ADC) 16.

In the embodiment shown, the device comprises a single loudspeaker 22 and a single microphone 24 forming part of the echo generator system 26. However, the device of the invention shown in FIG. 1 may equally well be applied to a system in which the input signal X2$n$ is emitted into the echo generator system by a plurality of loudspeakers 22 reproducing the same sound signal and the output signal Yin is obtained from the echo generator system by means of a plurality of microphones 24.

According to the invention, the echo processing device comprises a module 30 for calculating a coupling variable COR characteristic of the acoustic coupling between the direct signal X1$n$ or the input signal X2$n$ and the output signal Y1$n$.

To this end, the calculation module 30 comprises a calculation unit 34. The coupling variable COR is calculated by the unit 34 and then used by the gain calculation module 36 to calculate the receive gain Gr$_n$ and the send gain Ge$_n$.

In the embodiment shown in FIG. 1, the module 30 for calculating the coupling variable COR comprises a unit 28 for estimating the instantaneous power P1$n$ of the input signal X2$n$ and/or the direct signal X1$n$ and an unit for estimating the instantaneous power P2$n$ of the output signal Y1$n$.

In this embodiment, the gain calculation module 36 is designed to calculate the receive gain Gr$_n$ and the send gain Ge$_n$ on the basis of a variable G calculated by the calculation unit 34 as a function firstly of the estimated power P1$n$ of the direct signal and/or the input signal and the estimated power P2$n$ of the output signal, and secondly as a function of the coupling variable COR.

In a preferred embodiment of the invention, the variable G is determined by the calculation unit 34 from the following equation:

$$G = \frac{P2n}{P2n + COR \cdot P1n} \quad (1)$$

where P1$n$ and P2$n$ are respectively an estimate of the power of the direct signal X1$n$ or the input signal X2$n$ and an estimate of the power of the output signal Y1$n$, at the time concerned.

Accordingly, strong coupling (i.e. a high level of correlation) between the direct signal X1$n$ or the input signal X2$n$ and the output signal Y1$n$ yields a low value of the variable G to cancel echo, whereas weak coupling has the opposite effect on the variable G.

In a preferred embodiment of the invention, the gain calculation means 36 determine the receive gain Gr$_n$ and the send gain Ge$_n$ recursively from the following equations:

$$Ge_n = \gamma \cdot Ge_{n-1} + (1-\gamma) \cdot G$$

$$Gr_n = 1 - \delta \cdot Ge_n \quad (2)$$

where Ge$_{n-1}$ is the send gain at the preceding calculation time and $\gamma$ and $\delta$ are positive constants less than 1.

The above gain calculation equation (2), which is cited by way of example only, is derived from a calculation disclosed in French patent No. 2 748 184, modified in accordance with the invention to take into account the variable G defined above (equation (1)).

In one particular embodiment, good results have been obtained for a calculation at a frequency of 8 kiloHertz (kHz) with $\gamma$ equal to 0.95.

In the above calculation, the send and receive gains are directly linked to the variable G, which enables adaptive echo processing as a function of the real characteristics of the echo generator system. Moreover, the range of variation of the send gain Ge$_n$ is a decreasing function of the variable G, enabling automatic enhancement, by increasing the gain, of the sound quality as perceived by the remote party if the echo component of the signal picked up by the microphone decreases.

Incidentally, it should be noted that the above advantages are obtained without using voice activity detectors and double voice detectors, which in prior art echo processing devices are complex and sometimes insufficiently reliable.

Calculation of the Coupling Variable COR

According to the invention, the coupling variable COR which characterizes the acoustic coupling between the direct signal X1$n$ or the input signal X2$n$ and the output signal Y1$n$ is obtained by calculating the correlation between the direct signal X1$n$ or the input signal X2 and the output signal Y1$n$.

An envelope correlation calculation may be used, for example. Thus in one particular embodiment the coupling variable COR is defined as a function of the maximum value Maxcor of the values corr(j) of the correlation between the direct signal X1$n$ or the input signal X2$n$ and the output signal Y1$n$, said correlation values corr(j) being calculated over a time window considered, and each being obtained from the equation:

$$corr(j) = \frac{\sum_{i=0}^{LM-1} P1(i) \cdot P2(i+j)}{\sum_{i=0}^{LM-1} P1^2(i)} \quad (3)$$

in which i is a sampling time in the calculation time window of duration LM, j is a shift value between the input signal X2$n$ and the output signal Y1$n$, and P1($t$) and P2($t$) are respectively an estimate of the power of the direct signal X1$n$ or the input signal X2$n$ and an estimate of the power of the output signal Y1$n$, at a time t.

In practice, the envelope correlation calculation is effected over time windows of 1 second duration for each signal (input and output) and with a maximum time shift of 300 milliseconds between the signals. The calculation is effected at a reduced sampling frequency of 125 Hertz.

In this embodiment, very good results are obtained with the variable COR defined by the following equation, in which Exp designates the exponential function and k is a positive constant:

$$COR = Exp(k.Maxcor) \quad (4)$$

In practice, very good results are obtained with k equal to 3. Limiting the term Exp(3.Maxcor) to 25, corresponding to a maximum correlation of 1.07, is recommended.

A single-channel echo processing device according to a second embodiment of the invention is described next with reference to FIG. 2. This device combines a variable gain system like that described hereinabove with reference to FIG. 1 and an echo canceller.

Figure 2:
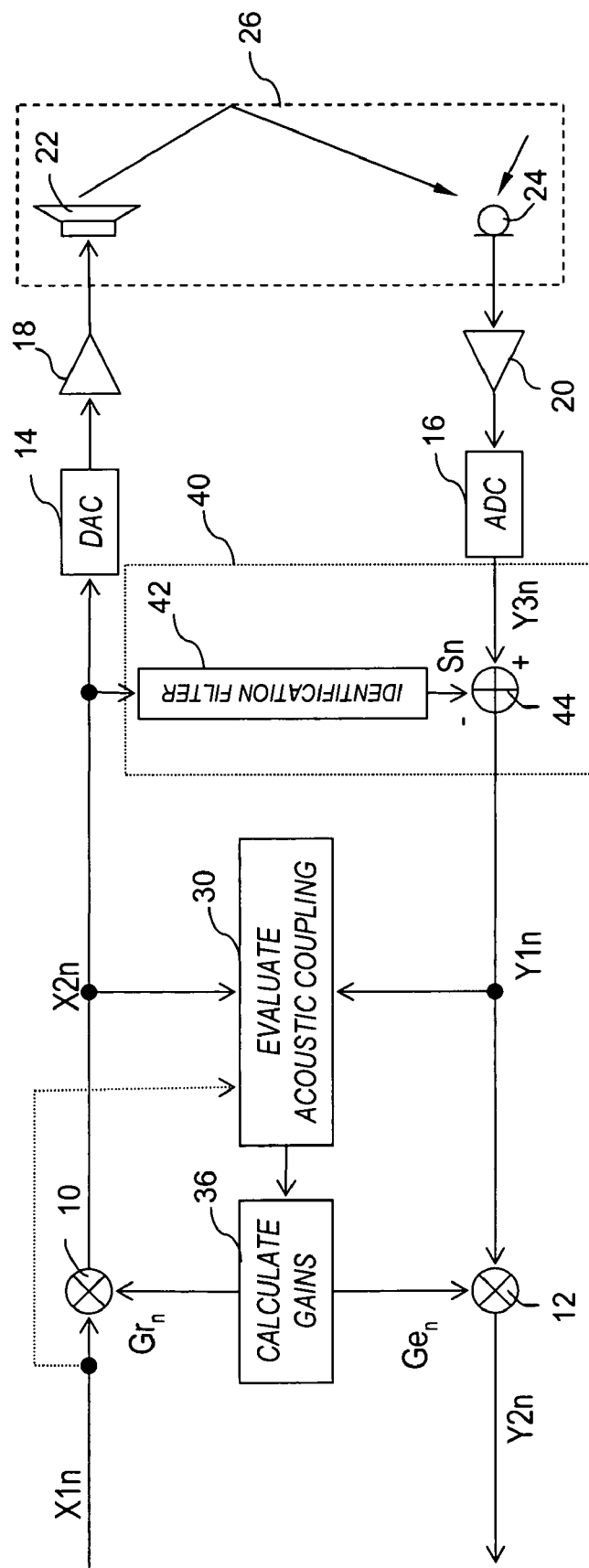
FIG. 2 is a block diagram of a single-channel echo processing device combining a variable gain system and an echo canceller, according to a second embodiment of the invention.

The echo processing device represented in FIG. 2 comprises, like that represented in FIG. 1, a module 36 for calculating the receive gain (Gr$_n$) and the send gain (Ge$_n$) and a module 30 for determining the variable COR to evaluate the acoustic coupling between the direct signal X1$n$ or the input signal X2$n$ and the output signal Y1$n$. The features and operation of the FIG. 2 modules 30 and 36 are identical to those of the FIG. 1 modules.

According to the invention, the device may further include an echo canceller 40 receiving at its input the input signal X2$n$ emitted into the echo generator system 26 and a signal Y3$n$ from the echo generator system 26. The echo canceller 40 conventionally comprises a finite impulse response identification filter 42 whose response is representative of the response of the echo generator system 26.

In operation, the identification filter 42 produces a filtering signal Sn and subtracts the filtering signal Sn from the signal Y3$n$ by means of a subtractor 44. It then produces the output signal Y1$n$ that is received as input by the multiplier 12, in order to apply to it a send gain Ge$_n$ calculated by the module 36.

In this embodiment, the system is initialized with the echo canceller 40 inactive (the identification filter 42 has not yet converged) to guarantee stability with no Larsen effect. Then, when the filter has converged, the coupling variable COR is evaluated non-intrusively by the module 30. In this embodiment the correlation referred to is that between the direct signal X1$n$ or the input signal X2$n$ and the signal Y1$n$ that constitutes the "residual" signal from the echo canceller 40.

The acoustic coupling is then evaluated cyclically to adapt the send and receive gains automatically as a function of acoustic coupling variations.

In this embodiment, the effects of a conventional echo canceller 40 and those of a variable gain echo processing device of the invention (FIG. 1) are combined to optimize echo processing.

In practice, in this embodiment, very good results are obtained with the variable COR defined as follows, as a function of Maxcor (see above):

$$COR = 0.75 \cdot \mathrm{Exp(Maxcor)} \quad (5)$$

A single-channel echo canceller according to a third embodiment of the invention is described next with reference to FIG. 3. In this embodiment, the principle of estimating the acoustic coupling between the input and output signals of an echo generator system, including calculation of the coupling variable COR as described hereinabove, is applied to calculating the adaptation step of the filter of an echo canceller.

Figure 3:
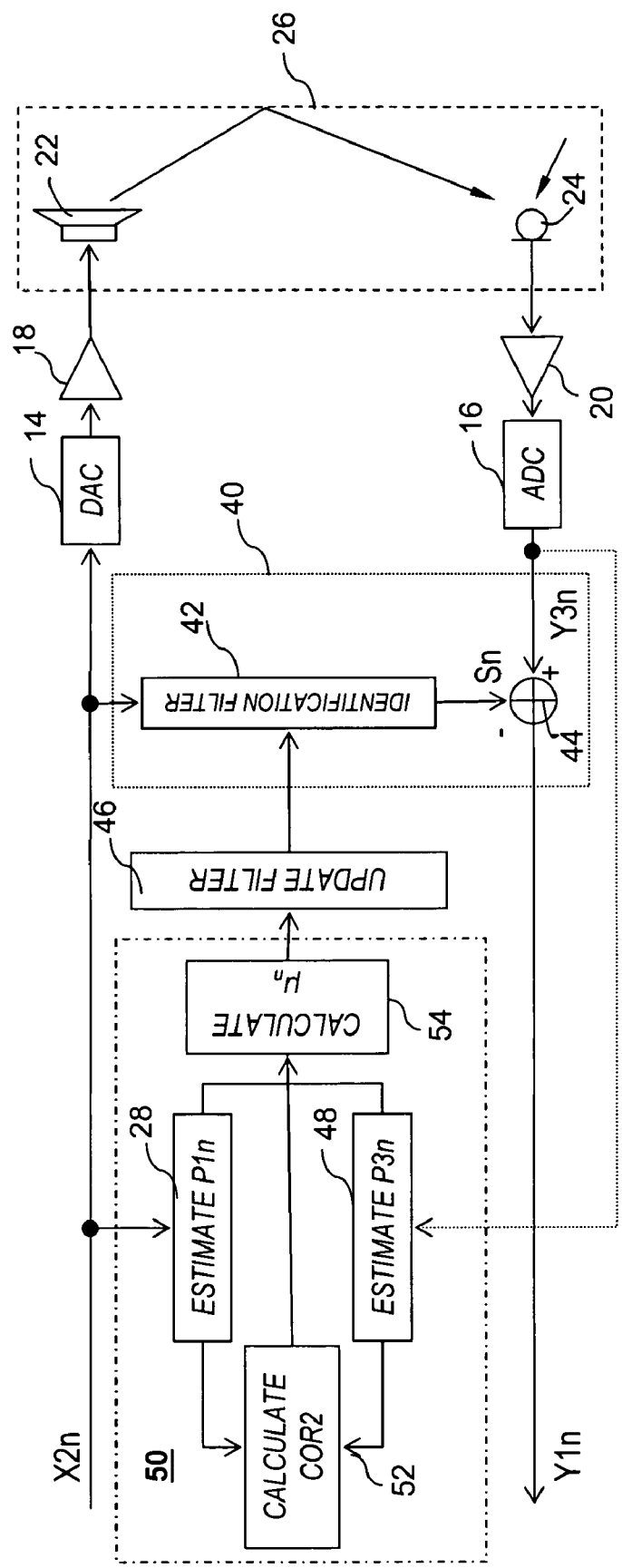
FIG. 3 is a block diagram of a single-channel echo canceller according to a third embodiment of the invention.

As shown in FIG. 3, an echo canceller of the invention conventionally comprises a finite impulse response identification filter 42 whose response is representative of the response of the echo generator system 26. The echo generator system comprises the combination of the loudspeaker 22, the microphone 24 and their physical environment (walls, background noise, etc.).

The filter 42 receives at its input an input signal X2$n$ that is emitted into the echo generator system 26 via a DAC 14 and an amplifier 18, and generates a filtering signal Sn.

The echo canceller comprises a subtractor 44 that receives a signal Y3$n$ from the echo generator system at its input via an amplifier 20 and an ADC 16. At least one component of the signal Y3$n$ is therefore a response of the echo generator system to the input signal X2$n$.

Furthermore, the subtractor 44 receives the filtering signal Sn at its input and therefore subtracts the filtering signal Sn from the signal Y3$n$ to produce an output signal Y1$n$.

The echo canceller comprises a module 46 for updating the coefficients of the identification filter as a function of an adaptation step $\mu_n$. It finally comprises a calculation module 50 for calculating the adaptation step $\mu_n$.

The module 50 for calculating the adaptation step of the filter comprises units 28, 48 for estimating the power P1$n$ of the input signal X2$n$ and the power P3$n$ of the signal Y3$n$.

The module 50 further comprises a unit 52 for calculating a coupling variable COR2 characteristic of the acoustic coupling between the input signal X2$n$ and the signal Y3$n$ coming from the echo generator system 26.

The module 50 finally comprises a unit 54 for calculating the adaptation step. According to the present invention, the adaptation step $\mu_n$ of the identification filter is calculated as a function of the estimated powers P1$n$, P3$n$ and the coupling variable COR2.

In a preferred embodiment of the invention, the adaptation step $\mu_n$ is obtained from the following equation:

$$\mu_n = \frac{P1n}{\alpha \cdot P1n + COR2 \cdot P3n} \quad (6)$$

in which $\alpha$ is a positive constant and P1$n$ and P3$n$ are respectively an estimate of the power of the input signal X2$n$ and an estimate of the power of the signal Y3$n$ from the echo generator system, at the time concerned.

Evaluating the above coupling variable COR2 therefore enables the adaptation step of the filter to be "driven" as a function of the real acoustic coupling between the input signal and the output signal of the echo generator system. This improves the responsiveness of the echo canceller as a function of changes in the acoustic environment of the device—for example after a variation in the sound reproduction volume by the user of the device or use of the device in a noisy environment (street, car, etc.)—and therefore improves the result of echo processing.

According to the same principle as applies to the variable COR defined above in relation to FIG. 1, the coupling variable COR2 is obtained by calculating the correlation between the input signal X2$n$ and the signal Y3$n$. In practice this is also an envelope correlation calculation. In a preferred embodiment, the coupling variable COR2 is defined as being a function of the maximum value Maxcor2 of the correlation values corr2($j$) calculated over a time window. Each of the correlation values corr2($j$) is calculated from the following equation:

$$corr2(j) = \frac{\sum_{i=0}^{LM-1} P1(i) \cdot P3(i+j)}{\sum_{i=0}^{LM-1} P1^2(i)} \quad (7)$$

in which:

$i$ is a sampling time in the calculation time window of duration LM and $j$ is a shift value between the input signal X2$n$ and the signal Y3$n$; and P1($t$) and P3($t$) are respectively an estimate of the power of the input signal X2$n$ and an estimate of the power of the signal Y3$n$, at the time t concerned.

In this embodiment, very good results have been obtained with the variable COR2 defined by the following equation, in which k is a positive constant:

$$COR2 = \frac{k}{Maxcor2} \quad (8)$$

In a fourth embodiment of the invention, the single-channel echo canceller described hereinabove has added to it a module for calculating a second coupling variable COR, so named by analogy with that from FIG. 1, that is characteristic of the acoustic coupling between the input signal X2$n$ of the echo generator system and the output signal Y1$n$ coming from the subtractor 44 of the echo canceller.

Figure 4:
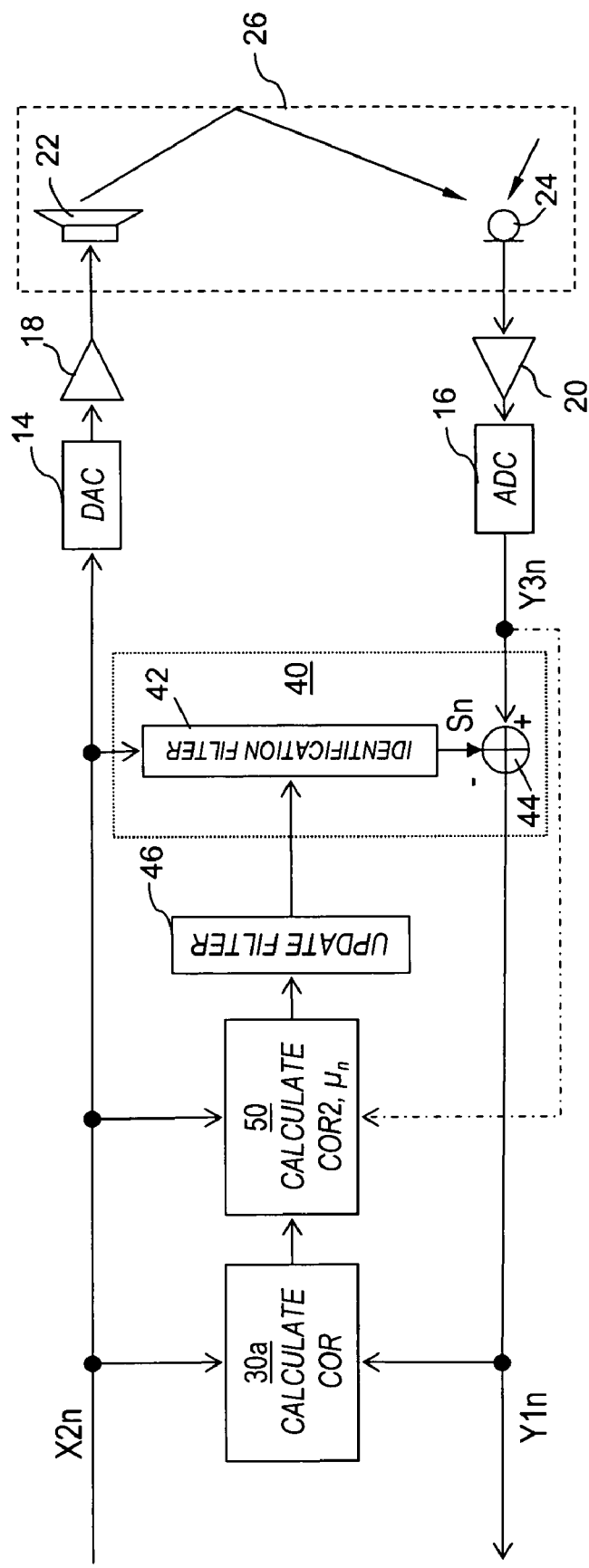
FIG. 4 is a block diagram of a single-channel echo canceller according to a fourth embodiment of the invention.

FIG. 4 shows an echo canceller according to this fourth embodiment. As shown in FIG. 4, the echo canceller comprises a module 50 for calculating the adaptation step $\mu_n$ similar to that described with reference to FIG. 3. The device further comprises a unit 30a for calculating a second coupling variable COR.

The variable COR is characteristic of the acoustic coupling between the input signal X2$n$ of the echo generator system 26 and the output signal Y1$n$. The second coupling variable COR is obtained by calculating the correlation between the input signal X2$n$ and the output signal Y1$n$.

The calculation unit 30$a$ is similar to the unit 30 described above with reference to FIG. 1.

In the embodiment shown in FIG. 4, the second variable COR is obtained by the same basic process as the variable COR defined above with reference to FIG. 1, i.e. by means of an envelope correlation calculation applied to the input signal X2$n$ and the output signal Y1$n$. In particular, the variable COR is defined as being a function of the maximum value Maxcor of the values of the correlation corr(j) between the input signal X2n and the output signal Y1n.

The second coupling variable COR calculated by the unit 30a is supplied to the unit 54 for calculating the adaptation step $\mu_n$ of the filter (see FIG. 3), with the result that this step is also calculated as a function of the second coupling variable COR.

In practice, the adaptation step $\mu_n$ is calculated from the following equation:

$$\mu_n = \frac{COR}{COR2} \cdot \frac{P1n}{\alpha.P1n + COR2 \cdot P3n} \tag{9}$$

in which $\alpha$ is a positive constant and P1n and P3n are respectively an estimate of the power of the input signal X2n and an estimate of the power of the signal Y3n from the echo generator system, at the time concerned.

In the embodiment in which the variable COR is a predetermined function f of the variable Maxcor and the variable COR2 is a predetermined function g of the variable Maxcor2 (see above), the above equation (9) may be expressed in the following form:

$$\mu_n = \frac{f(Maxcor)}{g(Maxcor2)} \cdot \frac{P1n}{\alpha.P1n + COR2 \cdot P3n} \tag{9a}$$

By additionally taking into account the second coupling variable COR, it is possible to determine the state of convergence of the identification filter and thus to achieve finer control of the adaptation step.

Figure 5:
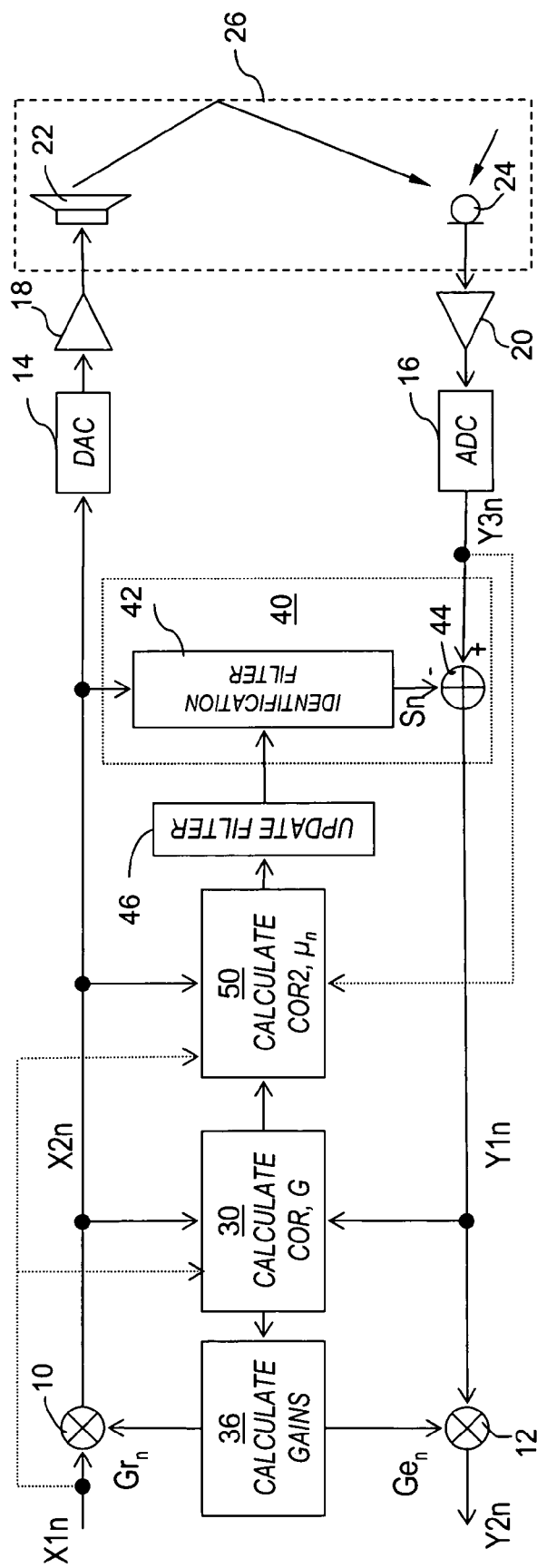
FIG. 5 is a block diagram of a single-channel echo processing device of the invention combining the features of the first and fourth embodiments of the invention.

Another embodiment of the invention combines the echo processing device described above with reference to FIG. 1 and the device described above with reference to FIG. 4. FIG. 5 shows a device of this kind.

In FIG. 5, the items referenced 10, 12, 36, 30 are identical to those represented in FIG. 1 and constitute a variable gain single-channel echo processing device of the invention. Furthermore, the items 50, 46, 40 are identical to those of the echo canceller shown in FIG. 4. When the units 30 and 50 are adapted so that the unit 30 is able to supply the variable COR to the unit 50 and the unit 50 is able to calculate the adaptation step of the filter 42 as a function of the variables COR, COR2, as explained above, then a combination of the systems described with reference to FIGS. 1 and 4 is obtained that combines the advantages of each of those two systems.

The present invention also applies to echo processing devices intended for a multichannel communications system.

A variable gain multichannel echo processing device constituting a fifth embodiment of the invention is described next with reference to FIG. 6.

Figure 6:
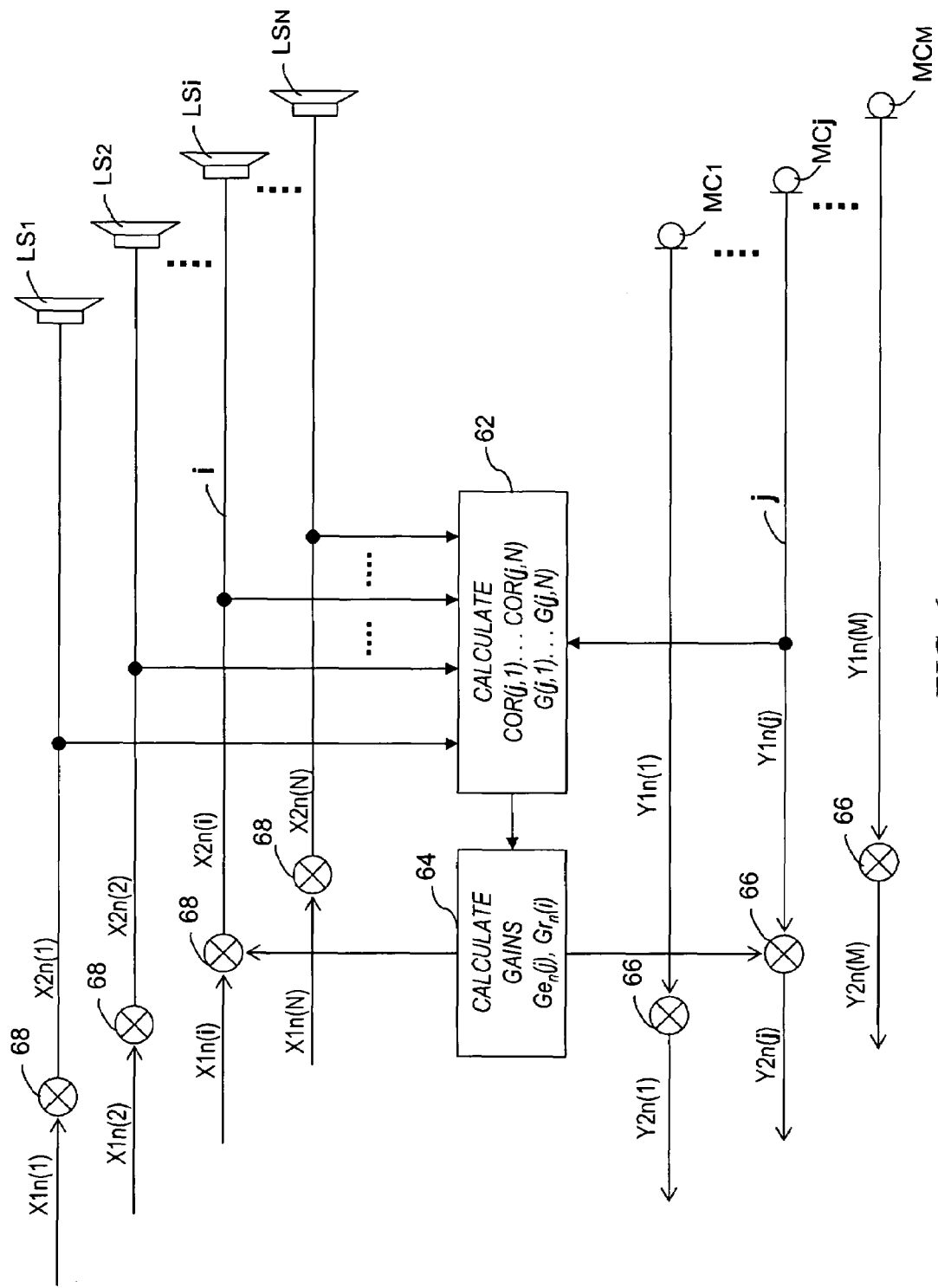
FIG. 6 is a block diagram of a variable-gain multichannel echo processing device according to a fifth embodiment of the invention.

As shown in FIG. 6, a variable gain multichannel echo processing device of the invention is intended to be used in a multichannel communications system comprising N receive channels, where N is an integer greater than or equal to 2, and M send channels, where M is an integer greater than or equal to 1.

Each of the N receive channels i comprises an output transducer LSi, typically a loudspeaker, which produces a sound pressure wave in response to an input signal X2n(i) derived from a direct signal X1n(i).

Each of the M send channels j comprises an input transducer MCj, typically a microphone, which converts a sound pressure wave into an output signal Y1n(j).

An echo processing device of the above kind is intended to attenuate in each output signal Y1n(j) echo components stemming from some or all of the N input signals X2n(i) and resulting from acoustic coupling between the microphone of the send channel concerned and some or all of the N loudspeakers.

As shown in FIG. 6, a variable gain multichannel echo processing device of the invention comprises a module 64 for calculating receive gains $Gr_n(i)$ and send gains $Ge_n(j)$.

It further comprises N multipliers 68 adapted to apply a receive gain $Gr_n(i)$ to each direct signal X1n(i) and produce the corresponding input signal X2n(i).

Similarly, the device comprises multipliers 66 adapted to apply a send gain $Ge_n(j)$ to each output signal Y1n(j) and produce a corresponding return signal Y2n(j).

It further comprises a module 62 for calculating N coupling variables COR(j,i), for i varying from 1 to N, for each send channel j, each of the N variables being characteristic of the acoustic coupling between the output signal Y1n(j) of the send channel j concerned and one of the N input signals X2n(i).

According to the invention, the gain calculation module 64 calculates each receive gain $Gr_n(i)$ and each send gain $Ge_n(j)$ on the basis of the N coupling variables COR(j,i) calculated for the associated send channel j.

The advantages relating to this gain calculation method with respect to a given pair (i,j) of receive and send channels are of the same nature as those obtained with the variable gain single-channel device of the invention described above with reference to FIG. 1.

Furthermore, a preferred embodiment of the multichannel echo processing device shown in FIG. 6 comprises a power calculation module (not shown) adapted to estimate the instantaneous power $P1n_i$ of each input signal X2n(i) and the instantaneous power $P2n_j$ of each output signal Y1n(j).

In this embodiment, the correlation variable COR calculation module 62 also calculates N variables G(j,i) for i varying from 1 to N, each of which is determined as a function of the estimated power P1n of an input signal X2n(i) and the estimated power $P2n_j$ of the output signal Y1n(j) of the send channel concerned. According to the invention, each of the variables G(j,i) is obtained from the following equation:

$$G(j, i) = \frac{P2n_j}{P2n_j + COR(j, i) \cdot P1n_i} \tag{10}$$

in which $P1n_i$ and $P2n_j$ are respectively an estimate of the power of the input signal X2n(i) concerned and an estimate of the power of the output signal Y1n(j) concerned, at the time concerned.

The gain calculation module 64 then calculates each send gain $Ge_n(j)$ on the basis of the N variables G(j,i) as a function of the corresponding coupling variable COR(j,i).

In a preferred embodiment, each send gain $Ge_n(j)$ is determined from the minimum value of the N variables G(j,i), for i varying from 1 to N, calculated for the associated send channel j.

In practice, each send gain $Ge_n(j)$ is determined from the following equation:

$$Ge_n(j) = \gamma \cdot Ge_{n-1}(j) + (1-\gamma) \cdot \min_i(G(j,i)) \tag{11}$$

in which $Ge_{n-1}(j)$ is the send gain of the send channel j at the time of the preceding calculation, $\gamma$ is a positive constant less than 1, and $\min_i(G(j,i))$ is the minimum value of the N variables G(j,i) for i varying from 1 to N.

Taking the minimum value $\min_i(G(j,i))$, the lowest gain (i.e. the highest attenuation) is applied to the channel j concerned, this gain therefore taking into account the greatest coupling value on all possible echo paths of the system.

Preferably (although this is not mandatory), in combination with the method of calculating the send gain explained hereinabove, all the receive gains $Gr_n(i)$ have the same value, determined from the following equation:

$$Gr_n(i) = 1 - \delta \cdot \max_j(Ge_n(j)) \quad (12)$$

in which $\delta$ is a positive constant less than 1 and $\max_j(Ge_n(j))$ is the maximum value of the M send gains $Ge_n(j)$, for j varying from 1 to M.

However, in a different embodiment of the device, shown in FIG. 6, each receive gain $Gr_n(i)$ is made equal to 1. This solution has the advantage of simplifying the calculation of the gains, combined with very good echo processing results.

Calculation of Each Coupling Variable COR(j,i)

According to the invention, each coupling variable COR(j,i) is obtained from a calculation of the correlation between the corresponding output signal $Y1n(j)$ and input signal $X2n(i)$. In a preferred embodiment, the calculation is an envelope correlation calculation.

In practice, each coupling variable COR(j,i) is obtained from the maximum value Maxcor of the values $corr_{ji}(d)$ of the correlation between the corresponding output signal $Y1n(j)$ and input signal $X2n(i)$, these correlation values $corr_{ji}(d)$ being calculated over a predefined time window. Each of the correlation values is obtained from the following equation:

$$corr_{ji}(d) = \frac{\sum_{c=0}^{LM-1} P1n_i(c) \cdot P2n_j(c+d)}{\sum_{c=0}^{LM-1} P1n_i^2(c)} \quad (13)$$

in which c is a sampling time in the calculation time window of duration LM, d is a shift value between the input signal $X2n(i)$ and the output signal $Y1n(j)$, and $P1n_i(t)$ and $P2n_j(t)$ are respectively an estimate of the power of the input signal $X2n(i)$ and an estimate of the power of the output signal $Y1n(j)$ at a time t.

A multichannel echo canceller constituting a sixth embodiment of the invention is described next with reference to FIG. 7. This embodiment may be considered as a generalization to the multichannel situation of the single-channel echo cancellers described above with reference to FIGS. 3 and 4.

Figure 7:
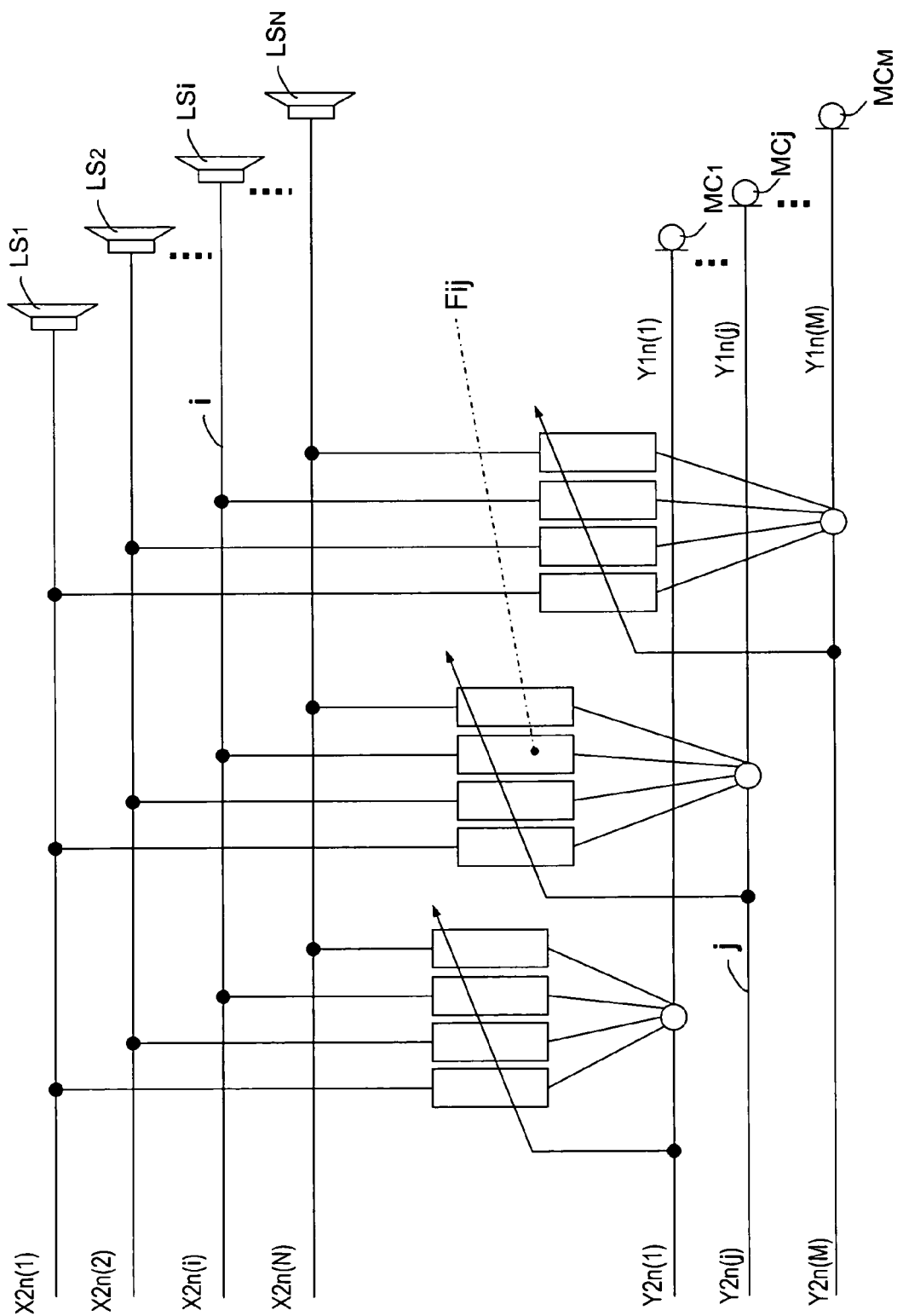
FIG. 7 is a block diagram of a multichannel echo canceller according to a sixth embodiment of the invention.

As shown in FIG. 7, a multichannel echo canceller of the invention comprises N receive channels, where N is an integer greater than or equal to 2, and M send channels, where M is an integer greater than or equal to 1.

Each of the N receive channels i comprises an output transducer (loudspeaker) LSi that produces a sound pressure wave in response to an input signal $X2n(i)$. Each of the M send channels j comprises an input transducer (microphone) MCj that converts a sound pressure wave into an output signal $Y1n(j)$.

Furthermore, the echo canceller comprises, for each send channel j, N identification filters Fij with variable coefficients for estimating the acoustic coupling between each of the N loudspeakers LSi and the microphone MCj of the send channel j. It further comprises, for each filter Fij, means (not shown) for adapting the coefficients of the filter as a function of an adaptation step $\mu_n(i,j)$ and means (not shown) for calculating the adaptation step $\mu_n(i,j)$.

Each filter Fij associated with a receive channel i and a send channel j generates a filtering signal that is subtracted from the output signal $Y1n(j)$ to produce a filtered signal $Y2n(j)$.

According to the invention, the device further comprises means (not shown) for estimating the instantaneous power $P1n_i$ of each input signal $X2n(i)$ and the instantaneous power $P2n_j$ of each output signal $Y1n(j)$.

It also comprises means (not shown) for calculating, for each send channel j, N coupling variables COR(j,i), for i varying from 1 to N, each of which being characteristic of the acoustic coupling between the output signal $Y1n(j)$ of the send channel concerned and one of the N input signals $X2n(i)$.

The means for calculating the adaptation step $\mu_n(i,j)$ for a filter Fij associated with a given receive channel i and a given send channel j calculate the adaptation step $\mu_n(i,j)$ as a function of:

the estimated powers $P1n_i$ (for i varying from 1 to N) calculated for the N receive channels i, the estimated power $P2n_j$ calculated for the send channel j, and the N coupling variables COR(j,i), for i varying from 1 to N, associated with the send channel j concerned.

Calculation of Each Coupling Variable COR(j,i)

In this embodiment, each coupling variable COR(j,i) is obtained from a correlation calculation between the output signal $Y1n(j)$ and the input signal $X2n(i)$ associated with the pair of receive and send channels (i,j) concerned.

As in the other embodiments of the invention described above, in a preferred embodiment, the correlation calculation is an envelope correlation calculation.

In practice, each coupling variable COR(j,i) is obtained from the maximum value Maxcor(j,i) of the values $corr_{ji}(d)$ of the correlation calculated over a respective predefined time window, each of the correlation values $corr_{ji}(d)$ being calculated from the following equation:

$$corr_{ji}(d) = \frac{\sum_{c=0}^{LM-1} P1n_i(c) \cdot P2n_j(c+d)}{\sum_{c=0}^{LM-1} P1n_i^2(c)} \quad (14)$$

in which c is a sampling time in the calculation time window of duration LM, d is a shift value between the input signal $X2n(i)$ and the output signal $Y1n(j)$, and $P1n_i(t)$ and $P2n_j(t)$ are respectively an estimate of the power of the input signal $X2n(i)$ and an estimate of the power of the output signal $Y1n(j)$ at a time t.

In practice, each coupling variable COR(j,i) is related to the maximum value Maxcor(j,i) of the correlation values $corr_{ji}(d)$ by the following equation, in which k is a positive constant:

$$COR(j,i) = \frac{k}{Maxcor(j,i)} \quad (15)$$

Calculation of the Adaptation Step $\mu_n(i,j)$ for a Filter Fij

In this embodiment, an adaptation step $\mu_n(i,j)$ for a filter Fij associated with a receive channel i and a send channel j is obtained from the following equation, in which $b_i$ is a positive constant:

$$\mu_n(i, j) = \frac{P1n_i}{b_i \cdot P1n_i + COR(j, i) \cdot P2n_j + \sum_{k \neq i} COR(j, k) \cdot P1n_k} \quad (16)$$

Thanks to the presence in the above expression of the term $$\sum_{k \neq i} COR(j, k) \cdot P1n_k$$

for the step $\mu_n(i,j)$, the receive channels other than the channel i concerned do not interfere with the convergence of the filter Fij, and this is achieved in conjunction with automatic reduction of the value of the step. Furthermore, the presence of the variables COR(j,k) provides an indication of the real influence on the send channel j concerned of receive channels other than the channel i concerned.

In a similar manner to the single-channel situation described above with reference to FIG. 4, an embodiment of the multichannel echo canceller, shown in FIG. 7, may further comprise means for calculating, for each send channel j, N second coupling variables COR2(j,i) for i varying from 1 to N.

Each of the second coupling variables is characteristic of the acoustic coupling between the filtered signal Y2n(j) of the send channel j concerned and one of the N input signals X2n(i).

In this embodiment, the adaptation step $\mu_n(i,j)$ of an identification filter Fij associated with a receive channel i and a send channel j is calculated as a function of the first N coupling variables COR(j,i) and the second N coupling variables COR2(j,i).

In a preferred embodiment, the adaptation step $\mu_n(i,j)$ for a filter Fij associated with a receive channel i and a send channel j is obtained from the following equation, in which $b_i$ is a positive constant:

$$\mu_n(i, j) = \frac{COR(j, i)}{COR2(j, i)} \cdot \frac{P1n_i}{b_i \cdot P1n_i + COR(j, i) \cdot P2n_j + \sum_{k \neq i} COR(j, k) \cdot P1n_k} \quad (17)$$

A variable gain multichannel echo processing device of the invention (FIG. 6) may be combined with a multichannel echo canceller of the invention (FIG. 7) to combine their advantages.

In this case, this kind of multichannel device (not shown in the drawings) comprises, for each pair comprising a receive channel i and a send channel j, gain application means adapted to apply a receive gain $Gr_n(i)$ to the input signal X2n(i) and a send gain $Ge_n(j)$ to the filtered signal Y2n(j).

The gains $Gr_n(i)$, $Ge_n(j)$ are then calculated on the basis of the N second coupling variables COR2(j,i) determined for the send channel j, using the same basic principle as the device described above with reference to FIG. 6.

In practice, the various echo processing devices of the present invention described hereinabove may be obtained in the usual way by programming a digital signal processor (DSP). They may also be implemented by means of application-specific integrated circuits (ASIC).

Of course, the present invention is in no way limited to the embodiments described here, and to the contrary encompasses any variant that will be evident to the person skilled in the art.

The invention claimed is:

1. An echo processing device for attenuating echo components of a direct signal X1n in a return signal Y2n, said device comprising:

means for calculating a receive gain $Gr_n$ and a send gain $Ge_n$;

first gain application means for applying the receive gain $Gr_n$ to the direct signal and producing an input signal X2n emitted into an echo generator system;

second gain application means for applying the send gain $Ge_n$ to an output signal Y1n from the echo generator system and producing the return signal Y2n; and means for obtaining a coupling variable COR characteristic of the acoustic coupling between the direct signal X1n or the input signal X2n and the output signal Y1n, by calculating a correlation between the direct signal X1n or the input signal X2n and the output signal Y1n;

wherein said gain calculation means is configured to calculate the receive gain $Gr_n$ and the send gain $Ge_n$ based on said coupling variable.

2. An echo processing device according to claim 1, comprising means for estimating the instantaneous power of the direct signal X1n or the input signal X2n and the instantaneous power of the output signal Y1n, said gain calculation means being adapted to calculate the receive gain $Gr_n$ and the send gain $Ge_n$ on the basis of a variable G determined as a function of the estimated power of the direct signal or the input signal and the estimated power of the output signal, and as a function of the coupling variable COR, in accordance with the following equation:

$$G = \frac{P2n}{P2n + COR \cdot P1n}$$

where P1n and P2n are respectively an estimate at the time concerned of the power of the direct signal X1n or the input signal X2n and the power of the output signal Y1n.

3. An echo processing device according to claim 2, in which the gain calculation means determine the receive gain $Gr_n$ and the send gain $Ge_n$ recursively from the following equations:

$$Ge_n = \gamma \cdot Ge_{n-1} + (1-\gamma) \cdot G$$

$$Gr_n = 1 - \delta \cdot Ge_n$$

where $Ge_{n-1}$ is the send gain at the preceding calculation time and γ and δ are positive constants less than 1.

4. An echo processing device according to claim 1, in which the calculation of the correlation between the direct signal X1n or the input signal X2n and the output signal Y1n is an envelope correlation calculation.

5. An echo processing device according to claim 4, in which, in said envelope correlation calculation, the coupling variable COR is a function of the maximum value Maxcor of the values corr(j) of the correlation between the direct signal X1n or the input signal X2n and the output signal Y1n, said correlation values corr(j) being calculated over a time window considered, and each being obtained from the equation:

$$corr(j) = \frac{\sum_{i=0}^{LM-1} P1(i) \cdot P2(i+j)}{\sum_{i=0}^{LM-1} P1^2(i)}$$

in which i is a sampling time in the calculation time window of duration LM, j is a shift value between the input signal X2$n$ and the output signal Y1$n$, and P1($j$) and P2($j$) are respectively an estimate of the power of the direct signal X1$n$ or the input signal X2$n$ and an estimate of the power of the output signal Y1$n$ at a time t.

6. An echo processing device according to claim 5, in which the coupling variable COR is linked to the maximum value Maxcor of the correlation values corr(j) calculated over a calculation time window considered from the equation:

COR=Exp($k$.Maxcor)

in which Exp is the exponential function and k is a positive constant.

7. An echo processing device according to claim 1, in which the input signal X2$n$ is emitted into the echo generator system by at least one loudspeaker and the output signal Y1$n$ is obtained from the echo generator system by at least one microphone.

8. An echo processing device according to claim 1, further comprising an echo canceller receiving at its input said input signal X2$n$ emitted into the echo generator system and a signal Y3$n$ from the echo generator system, the echo canceller comprising a finite impulse response identification filter whose response is representative of the response of the echo generator system, and the identification filter being adapted to generate a filtering signal Sn and comprising means for subtracting the filtering signal Sn from the signal Y3$n$ to produce the output signal Y1$n$ that is received at the input of said send gain application means.

9. An echo canceller for attenuating in an output signal Y1$n$ echo components of an input signal X2$n$ emitted into an echo generator system, said device comprising:

a finite impulse response identification filter whose response is representative of the response of the echo generator system, receiving the input signal X2$n$ at its input and generating a filtering signal Sn;

subtraction means receiving at an input a signal Y3$n$ from the echo generator system, at least one component of which is a response of the echo generator system to the input signal X2$n$, and the filtering signal Sn, and adapted to subtract the filtering signal Sn from the signal Y3$n$ and to produce the output signal Y1$n$;

means for adapting the coefficients of the identification filter as a function of an adaptation $\mu_n$; and means for calculating the adaptation $\mu_n$, said adaptation calculation means comprising means for estimating the power P1$n$ of the input signal X2$n$ and the power P3$n$ of the signal Y3$n$ and means for obtaining a first coupling variable COR2 characteristic of the acoustic coupling between the input signal X2$n$ and the signal Y3$n$ from the echo generator system, by calculating a correlation between the input signal X2$n$ and the signal Y3$n$;

wherein the adaptation $\mu_n$ of the identification filter is calculated as a function of the estimated powers P1$n$, P3$n$ and as a function of the first coupling variable COR2.

10. A device according to claim 9, in which the adaptation $\mu_n$ is obtained from the equation:

$$\mu_n = \frac{P1n}{\alpha \cdot P1n + COR2 \cdot P3n}$$

in which $\alpha$ is a positive constant and P1$n$ and P3$n$ are respectively an estimate of the power of the input signal X2$n$ and an estimate of the power of the signal Y3$n$ from the echo generator system at the time concerned.

11. A device according to claim 9, in which the calculation of the correlation between the input signal X2$n$ and the signal Y3$n$ is an envelope correlation calculation.

12. A device according to claim 11, in which the first coupling variable COR2 is a function of the maximum value Maxcor2 of correlation values corr2($j$) calculated over a time window considered, each of the correlation values corr2($j$) being calculated from the following equation:

$$corr2(j) = \frac{\sum_{i=0}^{LM-1} P1(i) \cdot P3(i+j)}{\sum_{i=0}^{LM-1} P1^2(i)}$$

in which:

i is a sampling time in the calculation time window of duration LM and j is a shift value between the input signal X2$n$ and the signal Y3$n$; and P1($t$) and P3($t$) are respectively an estimate of the power of the input signal X2$n$ and an estimate of the power of the signal Y3$n$ at the time t concerned.

13. A device according to claim 12, in which the first coupling variable COR2 is linked to the maximum value Maxcor2 of said correlation values corr2($j$) by the following equation, in which k is a positive constant:

$$COR2 = \frac{k}{Maxcor2}.$$

14. An echo canceller according to claim 9, in which the adaptation step calculation means further comprise means for calculating a second coupling variable COR characteristic of the acoustic coupling between the input signal X2$n$ from the echo generator system and the output signal Y1$n$, the second coupling variable COR being obtained by calculating the correlation between the input signal X2$n$ and the output signal Y1$n$, and the adaptation step $\mu_n$ of the identification filter being calculated as also a function of the second coupling variable COR.

15. An echo canceller according to claim 14, in which the second coupling variable COR is obtained from an envelope correlation calculation between the input signal X2$n$ and the output signal Y1$n$.

16. An echo canceller according to claim 15, in which the second coupling variable COR is a function of the maximum value Maxcor of the values corr(j) of the correlation between the input signal X2$n$ and the output signal Y1$n$, said correla tion values corr(j) being calculated over a time window considered and each of them being obtained from the equation:

$$corr(j) = \frac{\sum_{i=0}^{LM-1} P1(i) \cdot P2(i+j)}{\sum_{i=0}^{LM-1} P1^2(i)}$$

in which i is a sampling time in the calculation window of duration LM, j is a shift value between the input signal X2$n$ and the output signal Y1$n$, and P1($t$) and P2($t$) are respectively an estimate of the power of the input signal X2$n$ and an estimate of the power of the output signal Y1$n$ at a time t.

17. An echo canceller according to claim 14, in which the adaptation step $\mu_n$ is calculated from the equation:

$$\mu_n = \frac{COR}{COR2} \cdot \frac{P1n}{\alpha.P1n + COR2 \cdot P3n}$$

in which α is a positive constant and P1$n$ and P3$n$ are respectively an estimate of the power of the input signal X2$n$ and an estimate of the power of the signal Y3$n$ from the echo generator system at the time concerned.

18. An echo processing device for a multichannel communications system comprising N receive channels, N being an integer greater than or equal to 2, and M send channels, M being an integer greater than or equal to 1, each of the N receive channels i comprising an output transducer (LSi) that produces a sound pressure wave in response to an input signal X2$n$($i$) derived from a direct signal X1$n$($i$), each of the M send channels j comprising an input transducer (MCj) that converts a sound pressure wave into an output signal Y1$n$($j$), said echo processing device being adapted to attenuate in each output signal Y1$n$($j$) echo components stemming from some or all of the N input signals X2$n$($i$) and resulting from the acoustic coupling between the input transducer of the send channel concerned and some or all of the M output transducers, said device comprising:

means for calculating receive gains Gr$_n$(i) and send gains Ge$_n$(j);

means for applying receive gains Gr$_n$(i) to each direct signal X1$n$(i) and producing a corresponding input signal X2$n$(i);

means for applying send gains Ge$_n$(j) to each output signal Y1$n$(j) and producing the corresponding return signal Y2$n$(j); and means for calculating, for each send channel j, N coupling variables COR(j,i), for i varying from 1 to N, each of which being characteristic of the acoustic coupling between the output signal Y1$n$(j) of the send channel and one of the N input signals X2$n$(i), each coupling variable COR(j,i) being obtained by calculating a correlation between the corresponding output signal Y1$n$(j) and the corresponding input signal Y2$n$(i);

wherein said gain calculation means is configured to calculate each receive gain Gr$_n$(i) and each send gain Ge$_n$(j) based on the N coupling variables COR(J,i) calculated for the associated send channel j.

19. A device according to claim 18, comprising means for estimating the instantaneous power P1$n_i$ of each input signal X2$n$(i) and the instantaneous power P2$n_j$ of each output signal Y1$n$(j), said send gain calculation means being adapted to calculate each send gain Ge$_n$(j) on the basis of N variables G(j,i), for i varying from 1 to N, each of which is determined as a function of the estimated power of an input signal X2$n$(i) and the estimated power of the output signal Y1$n$(j) of the send channel concerned and as a function of the corresponding coupling variable COR(j,i), each of the variables G(j,i) being obtained from the following equation:

$$G(j,i) = \frac{P2n_j}{P2n_j + COR(j,i) \cdot P1n_i}$$

in which P1$n_i$ and P2$n_j$ are respectively an estimate of the power of the input signal X2$n$(i) concerned and an estimate of the power of the output signal Y1$n$(j) concerned at the time concerned.

20. A device according to claim 19, in which each send gain Ge$_n$(j) is determined from the minimum value of the N variables G(j,i), for i varying from 1 to N, calculated for the associated send channel j.

21. A device according to claim 20, in which each send gain Ge$_n$(j) is determined from the equation:

$$Ge_n(j) = \gamma \cdot Ge_{n-1}(j) + (1-\gamma) \cdot \min_i(G(j,i))$$

in which Ge$_{n-1}$(j) is the send gain of the send channel j at the time of the preceding calculation, γ is a positive constant less than 1, and min$_i$(G(j,i)) is the minimum value of the N variables G(j,i) for i varying from 1 to N.

22. A device according to claim 21, in which all the receive gains Gr$_n$(i) have the same value, which is determined from the equation:

$$Gr_n(i) = 1 - \delta \cdot \max_j(Ge_n(j))$$

in which γ is a positive constant less than 1 and max$_j$(Ge$_n$(j)) is the maximum value of the M send gains Ge$_n$(j), for j varying from 1 to M.

23. A device according to claim 18, in which each of said receive gains Gr$_n$(i) is equal to 1.

24. A device according to claim 18, in which the calculation of the correlation between an output signal Y1$n$(j) and an input signal X2$n$(i) is an envelope correlation calculation.

25. A device according to claim 24, in which, in said envelope correlation calculation, each coupling variable COR(j,i) is a function of the maximum value Maxcor of the values corr$_{ji}$(d) of the correlation between the output signal Y1$n$(j) and the input signal X2$n$(i), said correlation values corr$_{ji}$(d) being calculated over a predefined time window and each obtained from the equation:

$$corr_{ji}(d) = \frac{\sum_{c=0}^{LM-1} P1n_i(c) \cdot P2n_j(c+d)}{\sum_{c=0}^{LM-1} P1n_i^2(c)}$$

in which c is a sampling time in the calculation time window of duration LM d is a shift value between the input signal X2$n$(i) and the output signal Y1$n$(j), and P1$n_i$(t) and P2$n_j$(t) are respectively an estimate of the power of the input signal X2$n$(i) and an estimate of the power of the output signal Y1$n$(j) at a time t.

26. An echo canceller for a multichannel communications system comprising N receive channels, N being an integer greater than or equal to 2, and M send channels, M being an integer greater than or equal to 1, each of the N receive channels i comprising an output transducer (LSi) that produces a sound pressure wave in response to an input signal X2n(i), and each of the M send channels j comprising an input transducer (MCj) that converts a sound pressure wave into an output signal Y1n(j), the echo canceller comprising:

for each send channel j, N identification filters Fij with variable coefficients for estimating the acoustic coupling between each of the N output transducers (LSi) and the input transducer (MCj) of the send channel j, and for each filter Fij, means for adapting the coefficients of the filter as a function of an adaptation step $\mu_n(i,j)$ and means for calculating the adaptation step $\mu_n(i,j)$, means for estimating the instantaneous power $P1n_i$ of each input signal X2n(i) and the instantaneous power P2nj of each output signal Y1n(j), and means for calculating, for each send channel j, N coupling variables COR(j,i), for i varying from 1 to N, each of which being characteristic of the acoustic coupling between the output signal Y1n(j) of the send channel j and one of the N input signals X2n (i), each coupling variable COR(j,i) being obtained by calculating a correlation between the output signal Y1n(j) and the input signal X2n(i);

wherein the means for calculating the adaptation step $\mu_n(i, j)$ for a filter Fij associated with a receive channel i and a send channel j is configured to calculate the adaptation step $\mu_n(i,j)$ as a function of the powers $P1n_i$, for i varying from 1 to N, estimated for the N receive channels, as a function of the estimated power P2nj of the send channel j, and as a function of the N coupling variables COR(j,i), for i varying from 1 to N, associated with the send channel j.

27. A device according to claim 26, in which an adaptation step $\mu_n(i,j)$ for a filter Fij associated with a receive channel i and a send channel j is obtained from the following equation, in which $b_i$ is a positive constant:

$$\mu_n(i, j) = \frac{P1n_i}{b_i \cdot P1n_i + COR(j, i) \cdot P2n_j + \sum_{k \neq i} COR(j, k) \cdot P1n_k}.$$

28. A device according to claim 26, in which the calculation of the correlation between the output signal Y1n(j) and the input signal X2n (i) is an envelope correlation calculation.

29. A device according to claim 28, in which the coupling variable COR(j,i) is a function of the maximum value Maxcor(j,i) of the correlation values $corr_{ji}(d)$, calculated over a time window considered, each of the correlation values $corr_{ji}(d)$ being calculated from the equation:

$$coor_{ji}(d) = \frac{\sum_{c=0}^{LM-1} P1n_i(c) \cdot P2n_j(c + d)}{\sum_{c=0}^{LM-1} P1n_i^2(c)}$$

in which c is a sampling time in the calculation time window of duration LM, d is a shift value between the input signal X2n(i) and the output signal Y1n(i), and $P1n_i(t)$ and $P2n_j(t)$ are respectively an estimate of the power of the input signal X2n(i) and an estimate of the power of the output signal Y1n(j) at a time t.

30. A device according to claim 29, in which the coupling variable COR(j,i) is linked to the maximum value Maxcor(j,i) of said correlation values $corr_{ji}(d)$ by the following equation, in which k is a positive constant:

$$COR(j, i) = \frac{k}{Maxcor(j, i)}.$$

31. A device according to claim 26, in which each filter Fij associated with a receive channel i, and a send channel j generates a filtering signal that is subtracted from the output signal Y1n(j) to provide a filtered signal Y2n(j), said device further comprising means for calculating, for each send channel j, N second coupling variables COR2 (j,i), for i varying from 1 to N, each of which being characteristic of the acoustic coupling between the filtered signal X2n(j) from the send channel and one of the N input signals X2n(i), the adaptation step $\mu_n(i,j)$ of an identification filter Fij associated with a receive channel i and a send channel j being calculated also as a function of said N second coupling variables COR2(j,i).

32. A device according to claim 31, in which an adaptation step $\mu_n(i,j)$ for a filter Fij associated with a receive channel i and a send channel j is obtained from the following equation, in which $b_i$ is a positive constant:

$$\mu_n(i, j) = \frac{COR(j, i)}{COR2(j, i)} \cdot \frac{P1n_i}{b_i \cdot P1n_i + COR(j, i) \cdot P2n_j + \sum_{k \neq i} COR(j, k) \cdot P1n_k}.$$

33. A device according to claim 31, further comprising, for each pair comprising a receive channel i and a send channel j, gain application means for applying a receive gain $Gr_n(i)$ to the input signal X2n(i) and a send gain $Ge_n(j)$ to the filtered signal Y2n(j), said gains $Gr_n(i)$, $Ge_n(j)$ being calculated on the basis of the N second coupling variables COR2(j,i) determined for the send channel i.

34. An echo processing device for attenuating echo components of a direct signal X1n in a return signal X2n, said device comprising:

means for calculating a receive gain $Gr_n$ and a send gain $Ge_n$;

first gain application means for applying the receive gain $Gr_n$ to the direct signal and producing an input signal X2n emitted into an echo generator system;

second gain application means for applying the send gain $Ge_n$ to an output signal Y1n from the echo generator system and producing the return signal Y2n;

means for obtaining a first coupling variable COR characteristic of the acoustic coupling between the direct signal X1n or the input signal X2n and the output signal Y1n, by calculating the correlation between the direct signal X1n or the input signal X2n and the output signal Y1n, said gain calculation means being adapted to calculate the receive gain $Gr_n$ and the send gain $Ge_n$ based on said first coupling variable COR; and an echo canceller receiving at its input said input signal X2n emitted into the echo generator system and a signal Y3n from the echo generator system, the echo canceller comprising:

a finite impulse response identification filter whose response is representative of the response of the echo generator system, the identification filter being adapted to generate a filtering signal Sn and comprising means for subtracting the filtering signal Sn from the signal Y3$n$ to produce said output signal Y1$n$ that is received at the input of said second gain application means, means for adapting the coefficients of the identification filter as a function of an adaptation step $\mu_n$; and means for calculating the adaptation step $\mu_n$, said adaptation step calculation means comprising means for estimating the power P1$n$ of the input signal X2$n$ or the direct signal X1$n$ and the power P3$n$ of the signal Y3$n$, and means for obtaining a second coupling variable COR2 characteristic of the acoustic coupling between the input signal X2$n$ or the direct signal X1$n$, and the signal Y3$n$ from the echo generator system, by calculating a correlation between the input signal X2$n$ or the direct signal X1$n$, and the signal Y3$n$;

wherein the adaptation $\mu_n$ of the identification filter is calculated as a function of the estimated powers P1$n$, P3$n$ and as a function of said second coupling variable COR2.

35. An echo processing device according to claim 34, in which said adaptation step $\mu_n$ of the identification filter is calculated also as a function of the first coupling variable COR.

* * * * *